United States Patent
Zahn et al.

(10) Patent No.: US 9,199,165 B2
(45) Date of Patent: Dec. 1, 2015

(54) GAME CLIP POPULARITY BASED CONTROL

(71) Applicant: Microsoft Corporation, Redmond, WA (US)

(72) Inventors: Jessica Zahn, Redmond, WA (US); Stephen Husak, Glen Allen, VA (US); Alvin Chen, Bellevue, WA (US); Daniel Broekman, Bellevue, WA (US); Ramon Zarazua Borri, Redmond, WA (US)

( * ) Notice: Subject to any disclaimer, the term of this patent is extended or adjusted under 35 U.S.C. 154(b) by 160 days.

(21) Appl. No.: 13/942,703

(22) Filed: Jul. 16, 2013

(65) Prior Publication Data
US 2015/0024839 A1    Jan. 22, 2015

(51) Int. Cl.
| | |
|---|---|
| A63F 9/24 | (2006.01) |
| A63F 13/00 | (2014.01) |
| G06F 17/00 | (2006.01) |
| G06F 19/00 | (2011.01) |
| H04N 21/214 | (2011.01) |
| H04N 21/2343 | (2011.01) |
| H04N 21/258 | (2011.01) |
| H04N 21/478 | (2011.01) |
| A63F 13/86 | (2014.01) |

(52) U.S. Cl.
CPC ............... *A63F 13/00* (2013.01); *A63F 13/86* (2014.09); *H04N 21/214* (2013.01); *H04N 21/2343* (2013.01); *H04N 21/25891* (2013.01); *H04N 21/4781* (2013.01); *A63F 2300/535* (2013.01)

(58) Field of Classification Search
CPC .................... A63F 13/355; A63F 2300/572
See application file for complete search history.

(56) References Cited

U.S. PATENT DOCUMENTS

| 8,298,087 B1 | 10/2012 | Smith |
| 2006/0058103 A1 | 3/2006 | Danieli et al. |
| 2008/0311997 A1 | 12/2008 | Goossen et al. |

(Continued)

FOREIGN PATENT DOCUMENTS

WO    03047710 A2    6/2003

OTHER PUBLICATIONS

Conklin, et al., "Video Coding for Streaming Media Delivery on the Internet", IEEE Transactions on Circuits and Systems for Video Technology, vol. 11, No. 3, Mar. 2001, pp. 269-281.

(Continued)

*Primary Examiner* — Kevin Y Kim
(74) *Attorney, Agent, or Firm* — Ben Tabor; Aaron Chetterjee; Micky Minhas

(57) ABSTRACT

Example apparatus and methods concern managing the encoding and storing of game clips that are automatically generated to record video game highlights. Encoding game clips for smooth streaming using adaptive bit rates requires significant processing resources and storing the multiple bit rate encodings consumes significant storage. Therefore, example apparatus and methods compute a predicted popularity for a game clip based on user factors (e.g., status), video game factors (e.g., popularity), game clip factors (e.g., importance of event, uniqueness of event), or other factors. Predicted popularity may differ from actual popularity, therefore the popularity score may be recomputed using actual observations (e.g., number of views of the game clip). Additionally, actual observations may identify correlations between the factors used to predict popularity and the factors that actually determine popularity. Therefore, the prediction function may be dynamically updated to improve the prediction function and thus to improve the user experience.

13 Claims, 8 Drawing Sheets

(56) References Cited

U.S. PATENT DOCUMENTS

| | | |
|---|---|---|
| 2009/0119730 A1 | 5/2009 | Perlman et al. |
| 2009/0131177 A1 | 5/2009 | Pearce |
| 2011/0098108 A1 | 4/2011 | Kuper et al. |
| 2011/0306395 A1 | 12/2011 | Ivory et al. |
| 2012/0290937 A1 | 11/2012 | Rothschild |
| 2012/0309511 A1 | 12/2012 | Chung et al. |
| 2013/0005471 A1 | 1/2013 | Chung et al. |

OTHER PUBLICATIONS

"International Search Report and Written Opinion received for PCT Patent Application No. PCT/US2014/046582", Mailed Date: Oct. 31, 2014, 12 Pages.

Campbell, et al., "Reinforcement Learning in Graphical Games", Retrieved at <<http://www.soe.rutgers.edu/sites/default/files/gset/RL.pdf>>, Retrieved date: Apr. 27, 2013, pp. 18.

Miller, Adam, "Express Yourself—Encoding Videos Using Microsoft Expression Encoder 3 SDK", Retrieved at <<http://msdn.microsoft.com/en-us/magazine/ff714558.aspx>>, Jun. 2010, pp. 7.

GAME CLIP POPULARITY BASED CONTROL

BACKGROUND

Online video game environments continue to yield remarkable moments for gamers. Just like television shows replay highlights of remarkable moments from physical games, online video game environments show replay highlights from video games. Unlike physical games (e.g., soccer), where there may be only a limited number of highlights, online video game environments provide opportunities for literally millions of highlights. These highlights may be automatically captured in "game clips". While it is likely that many of these "highlights" will never be watched, it is also likely that some game clips will become very popular and may even go viral. Unfortunately it may be difficult to predict which game clips will be popular and which game clips will not be popular.

Since the automatic generation of game clips that capture highlights in online video gaming environments is relatively new, predicting which highlights will be the most popular is a relatively new issue. In one example, automatic generation of game clips occurs in response to pre-defined conditions being satisfied in a game. When the conditions are satisfied (e.g., character dispatched, goal scored, high score achieved), the game clip is automatically generated. Additionally, since different delivery techniques that facilitate accommodating different download conditions (e.g., bit rates, processor power) are available, handling the difficult to predict most popular videos in multiple ways that facilitate improving a user experience for viewing those multiple versions of the most popular videos is also a relatively new issue. Conventional progressive download, where a portion of a game clip must be downloaded before display of the rest of the game clip can begin may provide a sub-optimal or even painful experience. However, encoding all game clips for download and viewing using techniques that are superior to progressive download in terms of user experience is impractical and perhaps even impossible. Game clips may consume significant amounts of memory, and encoding game clips for smooth streaming may consume significant processing time and power, especially when encoding for smooth streaming via adaptive bit rate streaming. Adaptive bit rate streaming involves detecting a user's bandwidth and processor capacity in real time and adjusting the quality of video stream accordingly. For adaptive bit rate streaming, source content may be encoded at multiple bit rates, where each of the different bit rate streams are segmented into small multi-second parts. Encoding all game clips for smooth streaming may be too expensive to maintain or outsource, may be too resource-intensive to be economically feasible, or may have other issues.

SUMMARY

This Summary is provided to introduce, in a simplified form, a selection of concepts that are further described below in the Detailed Description. This Summary is not intended to identify key features or essential features of the claimed subject matter, nor is it intended to be used to limit the scope of the claimed subject matter.

Example apparatus and methods consider factors including, but not limited to, user factors, title factors, or video factors to predict which game clips will be popular. Additional or alternative factors may be considered. Example apparatus and methods then selectively process (e.g., encode for smooth streaming) only a subset of the available game clips, where the subset is selected based, at least in part, on predicted popularity. The number of game clips that are encoded may be determined by the amount of resources (e.g., memory, processor cycles) allocated for encoding and storing game clips for a particular video game. The amount of resources may in turn be determined, for example, by the cost of those resources. Game clips that are predicted to be popular and for which there are available resources may be encoded into multiple bitrates for smooth streaming. The encoded game clips may then be stored in a separate content delivery network (CDN) to facilitate improving the user experience with respect to download and view speed. Since popularity may change, and since a predicted popularity may not match an actual popularity, decisions concerning which game clips are popular enough to be encoded and stored may be revisited at later times. Additionally, factors that contribute to identifying popularity may change over time or vary between games. Therefore a function for predicting or computing the popularity of a game clip, user, or video game may be adapted over time. Some users may generate game clips that are more popular or valuable than other users. Example apparatus and methods may identify a user responsible for a popular or otherwise valuable movie and reward that user.

Example apparatus and methods may be configured to automatically prioritize game content based on weighted factors. The prioritization may be used to determine which game content will be encoded for smooth streaming and then cached at strategic locations in a content delivery network. Prioritization, and thus encoding and caching, may occur when game content is created or at other, later times when encoding and caching criteria are met. Similarly, when encoding and caching criteria are no longer met for previously encoded and cached content, the resources may be reclaimed leaving the game content still available but through a different channel (e.g., progressive download). Example apparatus and methods may reconcile predictions to actual observations. As a result of the reconciliation, functions that predict value or popularity may be updated. The reconciliation may be based, for example, on actual views of game content. Users who create high-value content may receive additional resources, enhanced status, or other rewards in an online game environment in which the game content was created.

BRIEF DESCRIPTION OF THE DRAWINGS

The accompanying drawings illustrate various example apparatus, methods, and other embodiments described herein. It will be appreciated that the illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa. Furthermore, elements may not be drawn to scale.

DETAILED DESCRIPTION

Online video game environments continue to provide remarkable moments for gamers. Video games may be programmed to automatically capture these remarkable moments. Since they have been captured, gamers and game producers are interested in sharing highlights of these remarkable moments. With tens of millions of gamers playing hundreds of millions of hours of games, online video game environments provide opportunities for literally billions of potential highlights. These highlights may be automatically captured in "game clips". A game clip may be, for example, an electronic video recording (e.g., MP4) of a few seconds of game action (e.g., slaying a dragon). MP4, also referred to as MPEG-4 Part 14, is a digital multimedia format that can be used to store video and audio. With so many highlights available, it is inevitable that some will be more popular than others. Gamers and video game providers may be interested in making the most popular game clips easy to watch. However, it may be difficult to predict which game clips will be the most popular.

Figure 1:
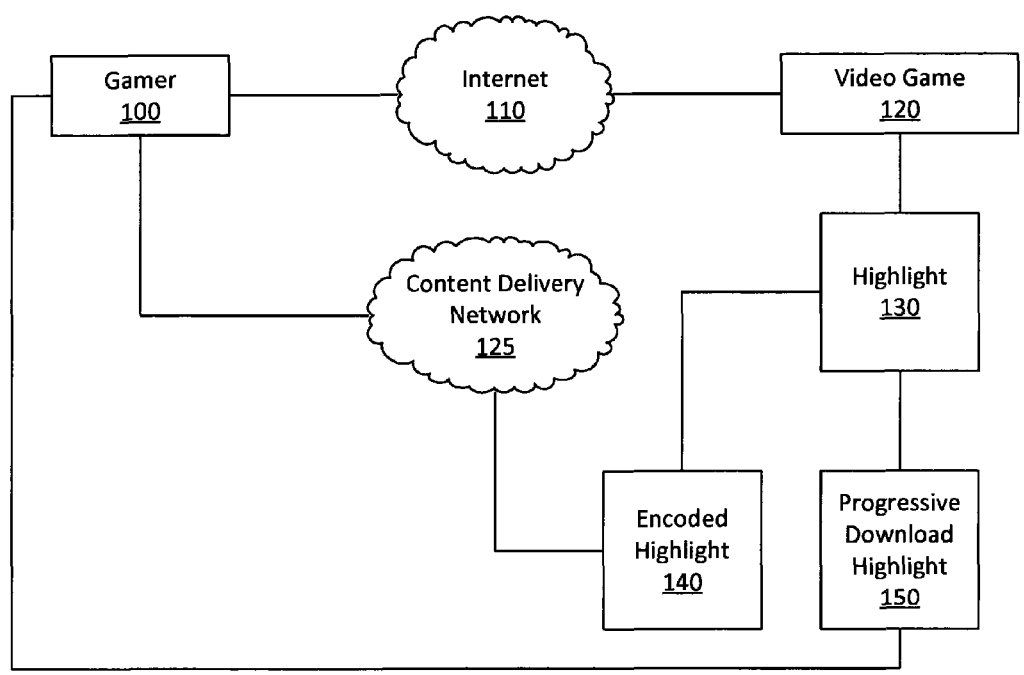
FIG. 1 illustrates an example online video game environment including a content delivery network.

FIG. 1 illustrates an example online video game environment in which a highlight 130 might be produced. A gamer 100 may be playing a video game 120 across the internet 110. The gamer 100 may take an action that the video game 120 or the gamer 100 considers particularly interesting. For example, the gamer 100 may score a game-winning goal, may dispatch a particularly nasty creature, may achieve a high score, or other action. The highlight 130 may be taken from the video game 120 in response to the interesting action. Since one point of having a highlight is to be able share the highlight with others, the highlight 130 may be prepared to share as a progressive download highlight 150. However, progressive download may provide a sub-optimal experience for some viewers. Therefore, to improve the user experience for viewing highlights, particularly popular highlights may be prepared to share as encoded highlights 140. To facilitate improving the user experience even more, these particularly popular highlights may be positioned in a content delivery network 125 that facilitates a more optimal delivery.

Unfortunately, even gamers that spend time in virtual worlds actually live in a tangible world of finite resources. For example, there are finite computing resources available to encode highlights into encoded highlights 140 and there is finite storage for storing encoded highlights 140. Therefore, example apparatus and methods select highlights for encoding and storing. Example apparatus and methods may make an initial selection based on a predicted popularity for highlight 130 and may then make a subsequent (re)selection based on an actual popularity for highlight 130. Additionally, as correlations between predictions and observations are made, the function(s) used to predict popularity may be updated to reflect these correlations.

Progressive download refers to an approach for viewing video that requires a portion of the video to be downloaded before playback begins. Smooth streaming refers to an approach for viewing video that allows playback to begin immediately. Adaptive bit rate smooth streaming may automatically adjust download or playback based on available bandwidth and resolutions. However, smooth streaming may be expensive to create and may require additional memory to store the multiple encodings. Smooth streaming may involve Internet Information Services (IIS) smooth streaming, Hypertext Transfer Protocol (HTTP) Live Streaming (HLS) smooth streaming, Dynamic Adaptive Streaming over HTTP (DASH), or other smooth streaming approaches.

Some portions of the detailed descriptions that follow are presented in terms of algorithms and symbolic representations of operations on data bits within a memory. These algorithmic descriptions and representations are used by those skilled in the art to convey the substance of their work to others. An algorithm is considered to be a sequence of operations that produce a result. The operations may include creating and manipulating physical quantities that may take the form of electronic values. Creating or manipulating a physical quantity in the form of an electronic value produces a concrete, tangible, useful, real-world result.

It has proven convenient at times, principally for reasons of common usage, to refer to these signals as bits, values, elements, symbols, characters, terms, numbers, and other terms. It should be borne in mind, however, that these and similar terms are to be associated with the appropriate physical quantities and are merely convenient labels applied to these quantities. Unless specifically stated otherwise, it is appreciated that throughout the description, terms including processing, computing, and determining, refer to actions and processes of a computer system, logic, processor, system-on-a-chip (SoC), or similar electronic device that manipulates and transforms data represented as physical quantities (e.g., electronic values).

Example methods may be better appreciated with reference to flow diagrams. For simplicity, the illustrated methodologies are shown and described as a series of blocks. However, the methodologies may not be limited by the order of the blocks because, in some embodiments, the blocks may occur in different orders than shown and described. Moreover, fewer than all the illustrated blocks may be required to implement an example methodology. Blocks may be combined or separated into multiple components. Furthermore, additional or alternative methodologies can employ additional, not illustrated blocks.

Figure 2:
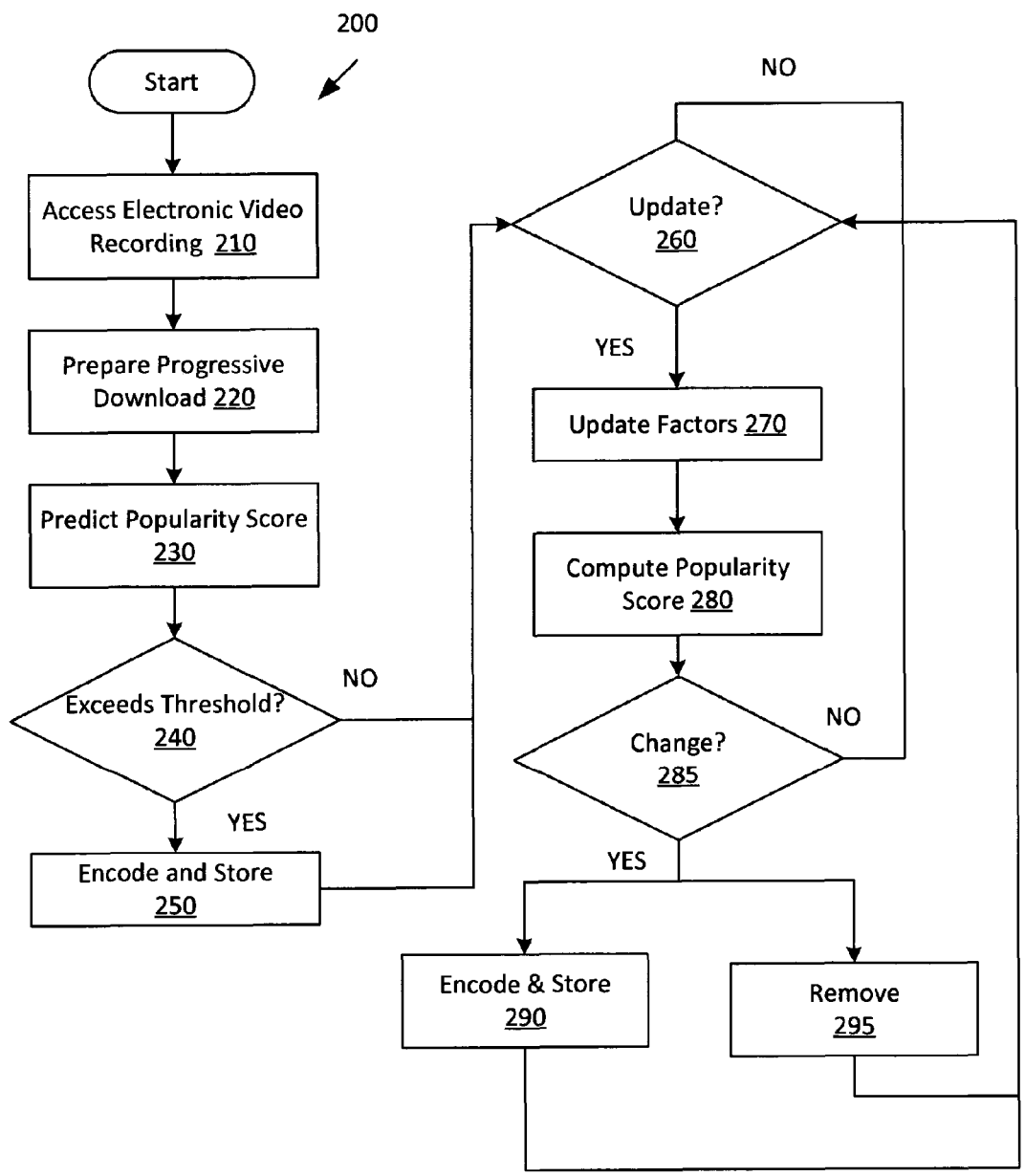
FIG. 2 illustrates an example method associated with controlling smooth streaming encoding as a function of video game clip popularity.

FIG. 2 illustrates an example method 200 associated with controlling smooth streaming encoding as a function of video game clip popularity. In different examples, method 200 may be performed on a single device, may be performed partially or completely in the cloud, may be performed on distributed co-operating devices, or may be performed other ways. In different examples, method 200 may be performed on devices including, but not limited to, a computer, a laptop computer, a tablet computer, a phone, and a smart phone.

Method 200 may include, at 210, accessing an electronic video recording (EVR). Accessing the EVR may include receiving the EVR, receiving a pointer to the EVR, receiving a link to the EVR, storing the EVR, or other action. The EVR may have been automatically generated in response to a video game action performed by a user of a video game. The video game action may be, for example, scoring a goal, slaying a dragon, reaching an interesting location in a game space, achieving a high score, being the last survivor in a multiplayer game, or other action. In one example, the action will have occurred in an online video game environment.

Method 200 may also include, at 220, preparing the electronic video recording for progressive download. Preparing the EVR for progressive download may include encoding the EVR for a specific bitrate, storing the EVR in a specific location, updating metadata concerning the size, speed, and availability of the EVR, or other actions. In one embodiment, the EVR may only be prepared for progressive download if the EVR is not prepared for smooth streaming.

Method 200 may also include, at 230, computing a first electronic score that represents a predicted popularity of the electronic video recording. Since the EVR has not yet been viewed, only a prediction is possible. The prediction may depend on different factors. In one embodiment, the first electronic score is computed as a function of a first factor associated with the user, a second factor associated with the video game, or a third factor associated with the electronic video recording. In one embodiment, the predicted popularity may be based solely on first factors associated with the user (e.g., user popularity, user status). In another embodiment, the predicted popularity may be based solely on factors associated with the video game (e.g., popularity, age). In yet another embodiment, the predicted popularity may be based solely on factors associated with the EVR, for example the moment captured in the EVR (e.g., first person to arrive at final destination in quest game). In yet another embodiment, the predicted popularity may be based on additional or alternative factors.

There may be a rich space from which factors associated with the user, the game, or the recording itself may be selected. For example, the first factors, those associated with the user, may include friend graph data (e.g., the number of people who follow the user, the number of people the user follows, the fan-in and fan-out of the extended social network). The user-centric factors may also include, for example, things the user has done (e.g., progress level achieved, achievements earned in the game from which highlight was generated, achievements earned in other games related to the game from which highlight was generated, how long the user has played the game from which the highlight was generated, how long the user has played other games related to the game from which the highlight was generated). The user-centric factors may also include, for example, the status or reputation of the user. The status and reputation may reflect how long the user has been involved with the game or the online video game environment. The status and reputation may also be related to factors outside the game environment (e.g., the gamer is a professional athlete or movie star). The user-centric factors may also include historical data about the user including, for example, the popularity of other highlights that have been recorded for the user. Other user-centric factors may also be considered.

The second factors, those related to the video game itself, may also include a large number and variety of items. For example, some factors may concern the age of the video game, how many hours the game has been played, how many users have played the game, how many users regularly play the game, or other factors. The second factors may also include the popularity of the game, which may be measured by the number of times the game has been purchased or downloaded, the amount of money that has been spent on the game, the reviews of the game, or other popularity items. The second factors may also concern highlights or other EVRs from the game. For example, the second factors may include a current number of electronic video recordings that exist for the video game, how many of the EVRs have been encoded for smooth streaming, or other factors. The second factors may also include how the game is played. For example, is the game played in single player mode, multi-player mode, or massively multi-player mode. The genre of the video game may also be considered, as may be the amount of downloadable content available for the video game. Additional second factors may include, for example, how many triggered video capture moments are defined for the video game (e.g., is this highlight one of three defined for the game, or is it highlight one of three hundred possible for the game), how difficult it is to acquire the EVR, or other factors.

The third factors concern the actual recording itself. Predicting the popularity of the EVR may involve analyzing data including the number of times the EVR has been viewed and the number of times the EVR has been rated. Certain views may be more significant than others, thus the third factors may include a number of times the electronic video recording was viewed via progressive download, which may be a suboptimal experience for the viewer. The third factors may also include information about searches for the EVR. For example, the number of times the EVR was returned in a query and the number of times the EVR was returned in a query and then not watched may be considered. What happens in the highlight may also be considered, thus the content of the EVR may be used in the prediction. For example, hitting a home run off a team's worst pitcher may result in a first (e.g., lower) rating while hitting a home run off a team's best pitcher may result in a second (e.g., higher) rating and hitting a home run off a legendary pitcher (e.g., Sandy Koufax) may yield a third (e.g., highest) rating. Similarly, the number of times the highlight has occurred may be considered. For example, the first time a particular dragon is slain may be news-worthy, but the one millionth time that same dragon is slain may not be. Whether the game generated the EVR or whether the user self-published the EVR may be considered. Whether the EVR was generated during single-user play, multi-user play, or massively multi-user play may be considered. For example, some games can be played in single user mode, with small teams (e.g., 4 players) of co-operating players in a finite sized game (e.g., 16 players), or in virtually open-ended contests where millions of players compete at the same time. The number of players involved at the time the highlight occurred may therefore be considered when predicting popularity. Other third factors may also be considered including, for example, a time at which the electronic video recording was last watched, a length of the electronic video recording, and a time at which the electronic video recording was generated.

In different embodiments, the first electronic score may include per-user ratings, per-title ratings, or per-EVR ratings. Additionally, different titles (e.g., video games) may have different combinations of factors or weights for factors. For example, for one video game the most important factor in determining popularity may be the size of the social graph of the user that generated the highlight while for another video game the most important factor may be the event(s) completed in the video. Thus, different video games may have different combinations of factors and those factors may be weighted differently.

Method 200 may also include, at 240, comparing the first electronic score to a popularity threshold. The popularity threshold may vary between video games. For example, some video games that have more resources may be able to store more EVRs and thus the popularity threshold may be lower while other video games that have fewer resources may be able to store less EVRs and thus the popularity threshold may be higher. Encoding may therefore be weighted between video games, where popular titles can have more highlight videos stored than less popular titles. Similarly, encoding may be weighted between users, where certain users can have more highlight videos encoded and stored than other users.

If the first electronic score exceeds a popularity threshold and if the content storage threshold has not been exceeded for the video game that generated the EVR, then method 200 proceeds, at 250, with encoding the electronic video recording into an encoded electronic video recording (EEVR) suitable for smooth streaming via adaptive bit rate streaming. Once the EEVR has been encoded, it is stored in a content delivery network (CDN) that is available to users of the online video game environment. Storing the EEVR in the CDN may facilitate faster downloads and an improved user experience.

Different video games may have different types of popularity thresholds. In one example, the popularity threshold may be an absolute threshold where all automatically generated electronic video recordings associated with the video game that exceed the popularity threshold are encoded. In another example, the popularity threshold may be a relative threshold and electronic video recordings will only be encoded and stored if their popularity score is higher than an already stored EVR.

A prediction may be useful for an initial determination concerning storing and encoding at 250. However, actual observations may also be useful for a continuing determination for storing and encoding. Therefore, method 200 may also include, at 260, making a decision concerning whether the factors upon which a popularity decision was made should be updated. The decision at 260 may depend, for example, on factors associated with the EVR, including whether the EVR has been viewed a threshold number of times (e.g., once, a hundred times, ten thousand times, a million times), a time period expiring (e.g., EVR has been available for an hour, for a day, for a week), the age of the electronic video recording, or the video game having been purchased more than a purchase threshold number of times (e.g., ten thousand purchases). The decision at 260 may also depend on factors associated with the user that generated the EVR including, for example, the user crossing a popularity threshold (e.g., the user becoming very popular, the user become less popular), the user crossing a skill threshold (e.g., the user becoming one of the ten best players of this video game in the world), the user crossing a score threshold (e.g., the user achieving one of the top ten scores in the world), or the user crossing an experience threshold (e.g., the user having played more than 1,000 hours of the game). Other factors may also be considered.

If the decision at 260 is yes, then method 200 proceeds, at 270, with updating the first factor, updating the second factor, or updating the third factor and, at 280, with computing the second electronic score. Updating the first factor to produce an updated first factor may include adding a first factor concerning the user, removing a first factor concerning the user, changing the relative importance (e.g., weighting) of the first factor, or other actions. Similarly, updating the second factor to produce an updated second factor or updating the third factor to produce an updated third factor may include adding a factor, removing a factor, changing the relative importance (e.g., weighting) of the factor, or other actions. Updating the factors reflects the reality that factors and functions may change over time. For example, a title's popularity may rise after release, peak, then decline. The popularity may have secondary peaks when additional content becomes available for download, when the title is re-released, when a celebrity is seen playing the game, or at other times. Thus, updating the factors takes into account the current observations about a user, game, or EVR instead of the initial predictions.

The second electronic score will represent an actual popularity of the electronic video recording. The second electronic score is computed as a function of the updated first factor, the updated second factor, or the updated third factor. The second electronic score, which represents the actual observed popularity, may differ from the first electronic score, which represented the predicted popularity. Actions may be taken depending on whether and how much the actual popularity differs from the predicted popularity. Actions may also be taken on just the actual popularity score. Thus, method 200 includes, at 285, comparing the actual popularity to the predicted popularity or comparing the actual popularity to a threshold(s) to determine whether a change in the encoding and storage status should occur.

In one embodiment, if the second electronic score is less than a removal threshold, and if the electronic video recording was encoded and stored in the content delivery network, then method 200 may proceed, at 295, by removing the encoded electronic video recording from the content delivery network. In another embodiment, if the second electronic score is less than the first electronic score by more than a desired amount, the removal may occur.

If the second electronic score is greater than an encoding threshold and if the electronic video recording was not encoded as an encoded electronic video recording, then method 200 may proceed, at 290, with encoding the electronic video recording as an encoded electronic video recording suitable for smooth streaming via adaptive bit rate streaming and storing the encoded electronic video recording in the content delivery network. In one embodiment, the encoding at 290 may only proceed if a quota number of EVRs have not already been encoded and stored. In one embodiment, the encoding may occur if the second electronic score exceeds the first electronic score by more than a desired amount. More generally, as observations of actual data (e.g., views of the EVR) provide opportunities for computing actual popularity, a decision about whether an EVR should or should not be encoded as an EEVR and stored in the CDN may be made and the EEVR may be added to or removed from the CDN.

Figure 3:
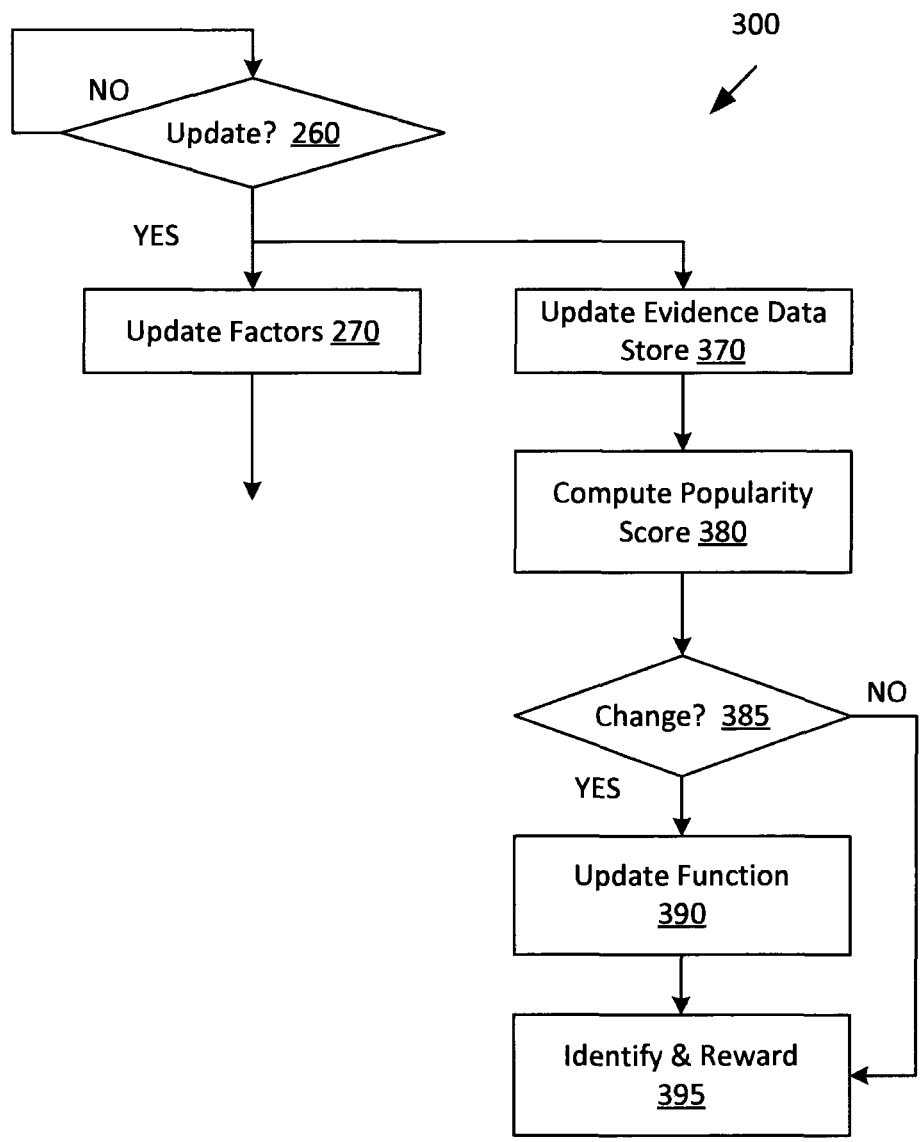
FIG. 3 illustrates a portion of an example method associated with controlling smooth streaming encoding as a function of video game clip popularity.

FIG. 3 illustrates a portion of an example method 300 associated with controlling smooth streaming encoding as a function of video game recording popularity. The portion of method 300 branches off from the update decision at 260 from method 200 (FIG. 2). The update decision at 260 leads to the update factors action at 270 but in method 300 also includes proceeding to the update evidence data store action at 370. The two branches may proceed at least partially in parallel.

The update decision at 260 may include detecting an event that triggers updating the evidence data store. The event may be, for example, someone watching the electronic video recording or the encoded electronic video recording. When someone watches a recording, or when someone passes on the opportunity to watch a video recording, evidence is gathered about the video. This evidence may be used, at 370, to update an evidence data store that stores information for understanding correlations between factors used to predict popularity and factors that actually determine popularity. Method 300 may include, at 380, re-computing the predicted popularity score using information in the updated evidence data store. Method 300 may also include, at 380, computing or re-computing the actual popularity score using information in the updated evidence data store. Some changes to the evidence data store may be minor while others may be more major. Therefore, method 300 includes, at 385, making a determination whether there has been a change in correlations detected in the evidence data store. For example, a prediction function may have considered five factors to predict popularity. Observations may identify the relative importance of these five factors. For example, there may be no correlation between one factor and the observed popularity while there may be a direct one-to-one correlation between another factor and the observed popularity. The observations may identify that correlations that were thought to exist do not actually exist or that unexpected correlations exist.

If the determination at 385 is yes, that a correlation change has been detected in the evidence data store, then method 300 may proceed, at 390, to update a function for computing the predicted popularity or for computing the actual popularity. Some factors may have been included in a popularity calculation but may not have actually reflected popularity. Other factors may have been included and may have turned out to be more important or even determinative of popularity. Therefore, factors that contributed more than a contribution threshold amount to the second electronic score may be enhanced while factors that contributed less than the contribution threshold may be diminished or removed. For example, a prediction function may have considered five factors to predict popularity. Observations may identify the relative importance of these five factors. For example, there may be no correlation between one factor and the observed popularity while there may be a direct one-to-one correlation between another factor and the observed popularity. The factor for which there is no correlation may be removed from the calculation while the factor with the direct correlation may be enhanced. Additionally, another factor that shares some traits with the factor having the direct correlation may be added to the calculation. The three other factors may have enough of a correlation to be maintained but their relative importance may be diminished by, for example, reducing a weight for the factor in the popularity prediction.

Updating the function at 390 may include adding a first factor, removing a first factor, changing the relative importance of a first factor, adding a second factor, removing a second factor, changing the relative importance of a second factor, adding a third factor, removing a third factor, or changing the relative importance of a third factor.

Method 300 may also include, at 395, identifying a set of the N most popular encoded electronic video recordings. N may be a function of the resources available for encoding and storing highlights for a video, which may in turn be a function of the popularity of a video. N may be an integer greater than two, greater than ten, or greater than some other number. Since there may be N recordings that qualify as "most popular" for a video, there may also be a set of users responsible for the creation of the set of most popular recordings. Video game providers, online video game environment providers, or others may be interested in rewarding users who generate popular recordings. Thus, method 300 may include, at 395, identifying the users that produced the "most popular" recordings for a game and then providing a reward to those users. In different embodiments, the reward may be, for example, additional storage in the online video game environment, recognition in the online video game environment, status in the online video game environment, a unique virtual item for use in the online video game environment, or a download code to access private content in the online video game environment. While these rewards are associated with the video game or the video game environment, in different embodiments other rewards may be provided.

While FIGS. 2 and 3 illustrates various actions occurring in serial, it is to be appreciated that various actions illustrated in FIGS. 2 and 3 could occur substantially in parallel. By way of illustration, a first process could compute predicted popularity, a second process could compute actual popularity, a third process could identify correlations and changes to be made to popularity functions, and a fourth process could encode and store selected recordings. While four processes are described, it is to be appreciated that a greater or lesser number of processes could be employed and that lightweight processes, regular processes, threads, and other approaches could be employed.

In one example, a method may be implemented as computer executable instructions. Thus, in one example, a computer-readable storage medium may store computer executable instructions that if executed by a machine (e.g., computer) cause the machine to perform methods described or claimed herein including methods 200 or 300. While executable instructions associated with the above methods are described as being stored on a computer-readable storage medium, it is to be appreciated that executable instructions associated with other example methods described or claimed herein may also be stored on a computer-readable storage medium. In different embodiments the example methods described herein may be triggered in different ways. In one embodiment, a method may be triggered manually by a user. In another example, a method may be triggered automatically.

"Computer-readable storage medium", as used herein, refers to a medium that stores instructions or data. "Computer-readable storage medium" does not refer to propagated signals, per se. A computer-readable storage medium may take forms, including, but not limited to, non-volatile media, and volatile media. Non-volatile media may include, for example, optical disks, magnetic disks, tapes, flash memory, ROM, and other media. Volatile media may include, for example, semiconductor memories, dynamic memory (e.g., dynamic random access memory (DRAM), synchronous dynamic random access memory (SDRAM), double data rate synchronous dynamic random-access memory (DDR SDRAM), etc.), and other media. Common forms of a computer-readable storage medium may include, but are not limited to, a floppy disk, a flexible disk, a hard disk, a magnetic tape, other magnetic medium, an application specific integrated circuit (ASIC), a compact disk (CD), other optical medium, a random access memory (RAM), a read only memory (ROM), a memory chip or card, a memory stick, and other media from which a computer, a processor or other electronic device can read.

Figure 4:
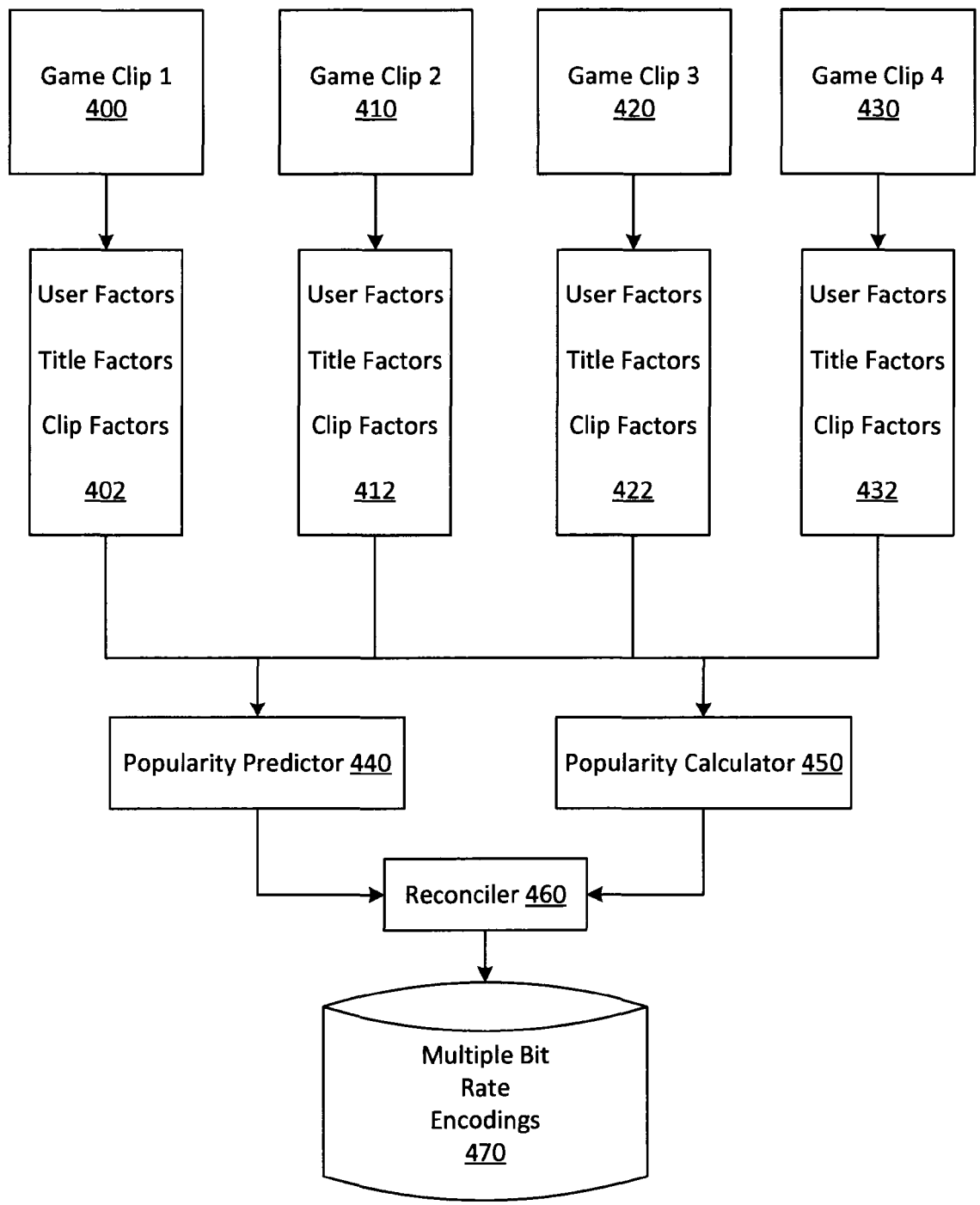
FIG. 4 illustrates example game clips and popularity computations.

FIG. 4 illustrates example game clips and popularity prediction computations. Electronic video recordings of highlight moments in a video game may be referred to as "game clips." FIG. 4 illustrates four game clips, clip1 400, clip2 410, clip3 420 and clip4 430. While four game clips are illustrated, popularity predictions and other processing may consider a greater or lesser number of game clips. Game clip1 400 is illustrated having factors 402 (e.g., user factors, title factors, clip factors) that are presented to both a popularity predictor 440 and a popularity calculator 450. The factors 402 may have initial values that are used by the popularity predictor 440. The factors 402 may be updated over time to take on updated values that are used by the popularity calculator 450. Similarly, game clip2 410 is illustrated having factors 412, game clip3 420 is illustrated having factors 422, and game clip4 430 is illustrated having factors 432.

The popularity predictor 440 may input the factors 402, 412, 422, and 432 to produce a popularity score for the different game clips. In one embodiment, the popularity score for a game clip is a function of just the factors associated with that game clip. In another embodiment, the popularity score for a game clip may be a function of factors associated with that game clip and with another game clip(s). In one embodiment, the popularity predictor 440 may produce raw scores for the four game clips or for the number of game clips that are available for scoring while in another embodiment the popularity predictor 440 may produce relative scores for the game clips available for scoring. In one embodiment, the popularity predictor 440 may provide information to the reconciler 460 about all game clips that get scored. In another embodiment, the popularity predictor 440 may only provide information about selected game clips (e.g., highest rated) to the reconciler 460.

Before there are any observations about the game clips, the reconciler 460 may select game clips to be encoded into multiple bit rate encodings 470 based on information from just the popularity predictor 440. Over time, as observations about the actual popularity of the game clips become available, the reconciler 460 may consider information from both the popularity predictor 440 and the popularity calculator 450. After a sufficient period of time has elapsed during which a sufficient number of observations have been acquired, reconciler 460 may select game clips to be encoded and stored based on information from just the popularity calculator 450. The reconciler 460 may also identify agreements and discrepancies between predictions and actual scores. These agreements and discrepancies may be used to update how the popularity predictor 440 or the popularity calculator 450 compute their respective scores.

Consider the following example scenario where four game clips are presented for consideration for encoding for adaptive bit rate smooth streaming based on popularity. Game clip1 400 is from a user who has a large friend graph, a poor reputation, and a high percent of achievements in the title. Game clip1 400 is from a title that is more than a year old. Game clip2 410 is from a user who has a large friend graph, a good reputation, and who has higher than average progress through the title. The title itself is very popular and less than a month old. Game clip3 420 is from a user who has a small friend graph and higher than average hours played in the title. The title is less than a month old and is very popular. Game clip4 430 is from a user who has a small friend graph and higher than average hours played in the title. The title itself is more than a year old. This data may be presented to a function that considers a larger than average friend graph to be worth one point and a smaller than average friend graph as being worth negative one point. The function may also consider a better than average reputation to be worth one point and a worse than average reputation to be worth minus one point. The function may also consider having a high percentage of achievements to be worth one point and having a low percentage of achievements to be worth minus 0.5 of a point. The function may also consider having above average progress to be worth two points, having below average progress to be worth minus one point, having a higher than average hours played to be worth 1.5 points, having a lower than average hours played to be worth minus one point, having the title age being less than a year old be worth one point, having the title age being more than a year old being worth minus 0.5 of a point, having a popular title being worth one point and having a not popular title as being worth minus one point. The values attributed to various factors may change over time based on behavior (e.g., game clip view, game clip ratings).

Given this data and this interpretation of the value of the various factors, popularity predictor 440 might compute a rating of 0.5 for game clip1 400, a rating of 6 for game clip2 410, a rating of 3.5 for game clip2 420, and a rating of 0 for game clip3 430. If the threshold for encoding were an absolute threshold set at 3, then game clip2 410 and game clip3 420 would be encoded and stored. If the threshold for encoding were a relative threshold where the top three got encoded and stored, then all the game clips except game clip4 430 would be encoded for smooth streaming. Game clip4 430 would still remain available for viewing via progressive download. In one embodiment, how many of the game clips would be encoded for smooth streaming via adaptive bit rate streaming might depend on how much of the quota for game clips had already been consumed. In one embodiment, the quota may be considered before computing the popularity prediction while in another embodiment the popularity may be computed first and then the quota considered.

Figure 5:
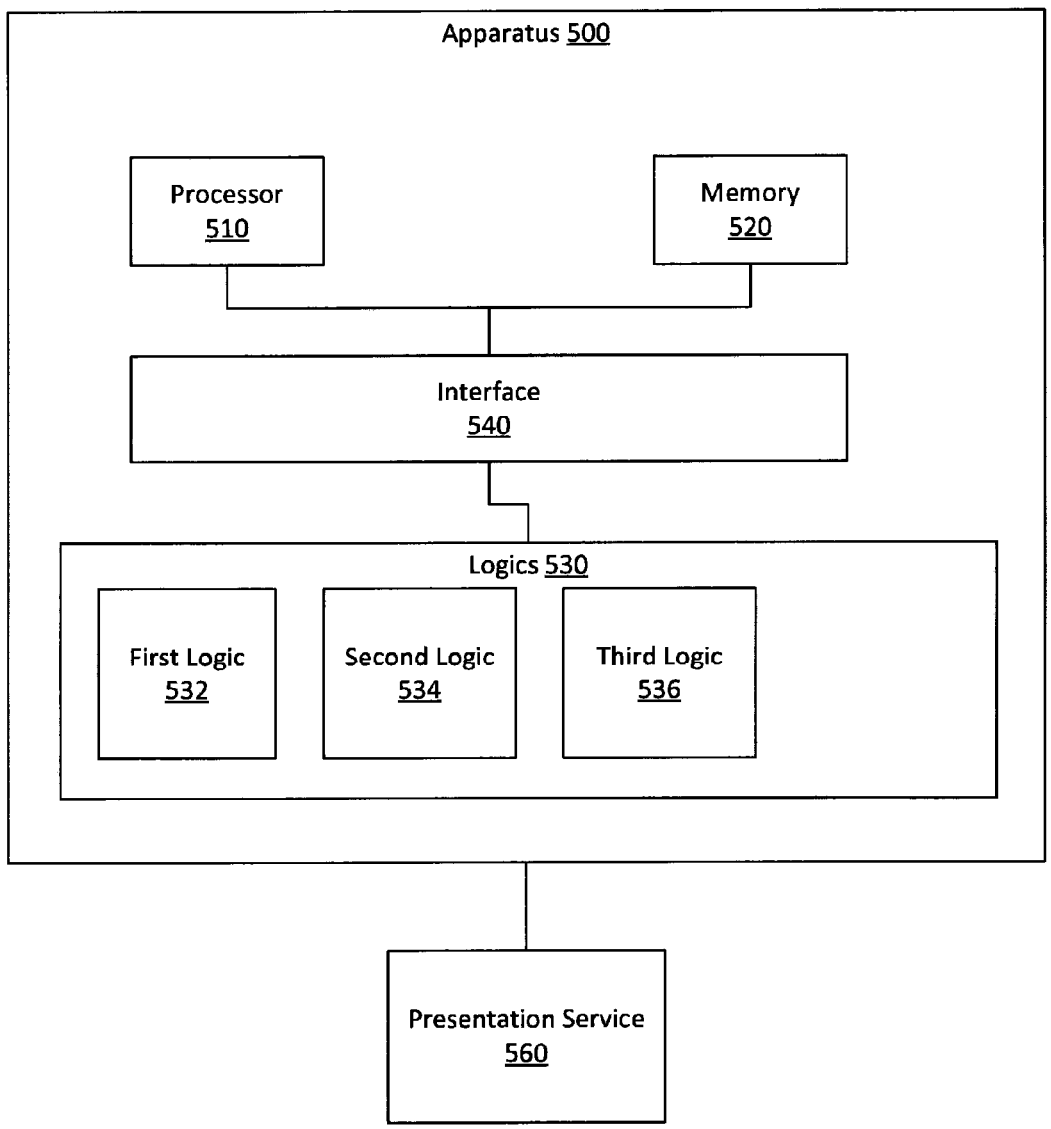
FIG. 5 illustrates an example apparatus configured to control smooth streaming encoding as a function of video game clip popularity.

FIG. 5 illustrates an apparatus 500 that includes a processor 510, a memory 520, a set 530 of logics, and an interface 540 that connects the processor 510, the memory 520, and the set 530 of logics. The set 530 of logics may be configured to control smooth streaming encoding as a function of video game clip popularity. Apparatus 500 may be, for example, a computer, a laptop computer, a tablet computer, a personal electronic device, a smart phone, a system-on-a-chip (SoC), or other device that can access and process data.

In one embodiment, the apparatus 500 may be a general purpose computer that has been transformed into a special purpose computer through the inclusion of the set 530 of logics. The set 530 of logics may be configured to control selective encoding for smooth streaming via adaptive bit rate streaming of automatically generated video game highlight game clips. Apparatus 500 may interact with other apparatus, processes, and services through, for example, a computer network.

The set 530 of logics may include a first logic 532 that is configured to predict a popularity of an automatically generated video game highlight game clip. The game clip may be referred to as an electronic video recording, highlight video, or in other ways. In one embodiment, the first logic 532 may be configured to predict the popularity of the game clip using a weighted, adaptive function. The weighted adaptive function may consider a property of a user whose action caused the game clip to be generated, a property of a video game for which the game clip was generated, and a property of the game clip itself. These properties may include attributes and values like those described in connection with method 200 and the user-centric first factors, the title-centric second factors, and the EVR-centric third factors.

The set 530 of logics may also include a second logic 534 that is configured to control selectively encoding and storing the automatically generated game clip in a content delivery network. In one embodiment, the second logic 534 may be configured to control encoding and storing as a function of the popularity of the game clip, either predicted or actual, and of a quota of game clips to be stored for the video game. If the popularity is high enough and if there are resources (e.g., processor cycles, memory) available, then the second logic 534 may cause the game clip to be encoded and stored. If the popularity is too low or if resources are too scarce, then the second logic 534 may prevent the game clip from being encoded and stored.

The set 530 of logics may also include a third logic 536 that is configured to control selectively removing an encoded version of the game clip from the content delivery network. In one embodiment, the third logic 536 may be configured to control removing a game clip as a function of comparing a predicted popularity to an actual popularity. In another embodiment, third logic 536 may be configured to control removing a game clip based on actual popularity without considering an earlier predicted popularity. Additionally, the third logic 536 may be configured to adapt operation of the first logic 532 or the second logic 534 in response to detecting a correlation between the predicted popularity and the actual popularity or in response to detecting a correlation between a factor and popularity. For example, if a certain factor is identified as being highly predictive of popularity, then operation of the first logic 532 or second logic 534 may be modified to reflect this highly predictive correlation. Similarly, if a factor is identified as being irrelevant to predicting popularity then operation of the first logic 532 or second logic 534 may be modified to ignore this factor.

In different embodiments, some processing may be performed on the apparatus 500 and some processing may be performed by an external service or apparatus. Thus, in one embodiment, apparatus 500 may also include a communication circuit that is configured to communicate with an external source to facilitate acquiring factors, acquiring factor values, acquiring information about observations, accessing a game clip, or other actions. In one embodiment, the third logic 536 may interact with a presentation service 560 to facilitate displaying data using different presentations for different devices. For example, information describing predicted popularity, actual popularity, an encoding action, a storing action, or a removal action may be presented to users.

Figure 6:
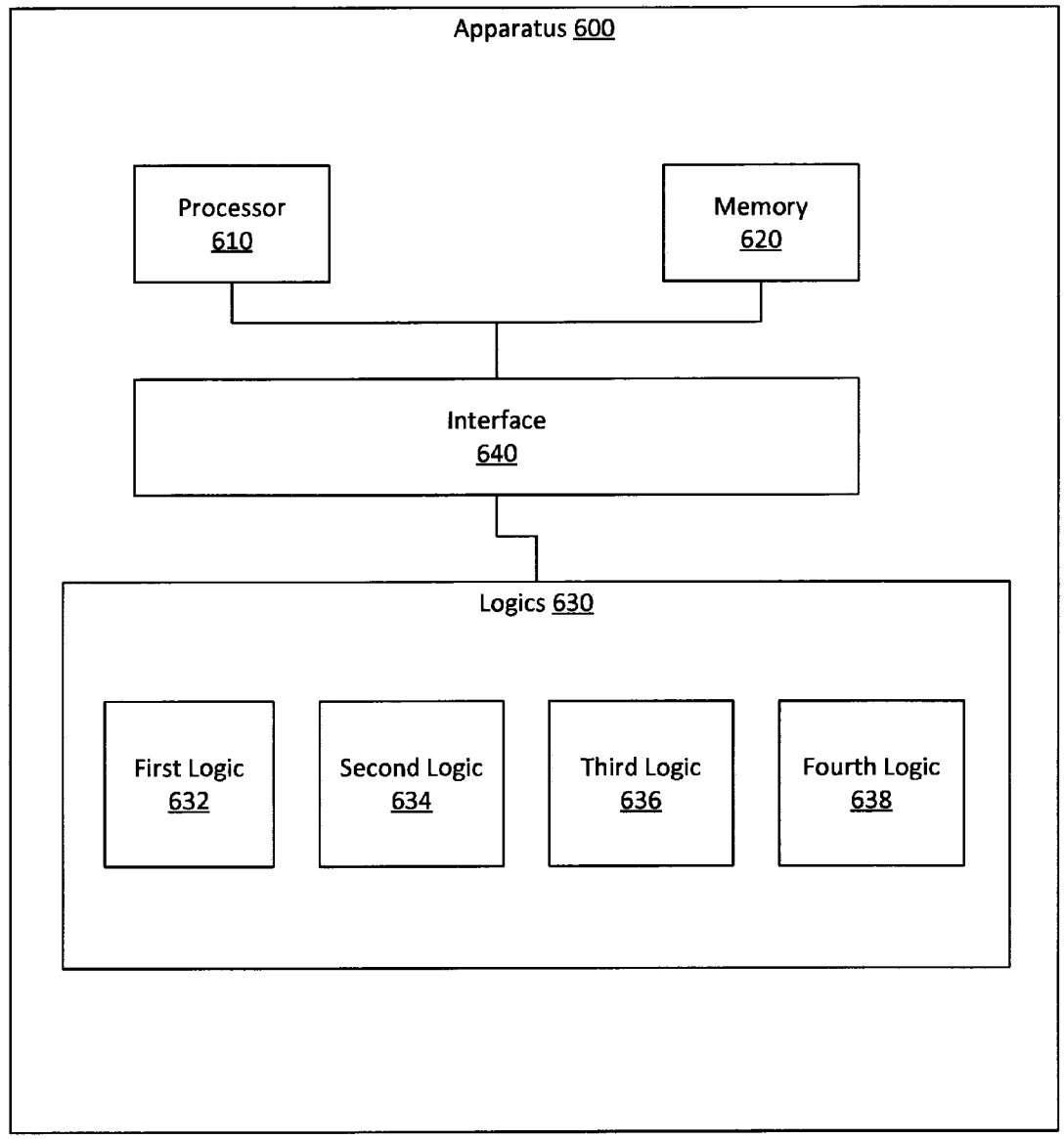
FIG. 6 illustrates an example apparatus configured to control smooth streaming encoding as a function of video game clip popularity.

FIG. 6 illustrates an apparatus 600 that is similar to apparatus 500 (FIG. 5). For example, apparatus 600 includes a processor 610, a memory 620, a set of logics 630 (e.g., 632, 634, 636) that correspond to the set of logics 530 (FIG. 5) and an interface 640. However, apparatus 600 includes an additional fourth logic 638. The fourth logic 638 may be configured to selectively reward users. The fourth logic 638 may identify a user that produced a popular game clip. If the actual popularity of the game clip satisfied a popularity criterion then the user may be rewarded. The reward may be, for example, additional resources, status, or recognition in the online video game environment from which the game clip was produced. Other rewards may be provided.

Figure 7:
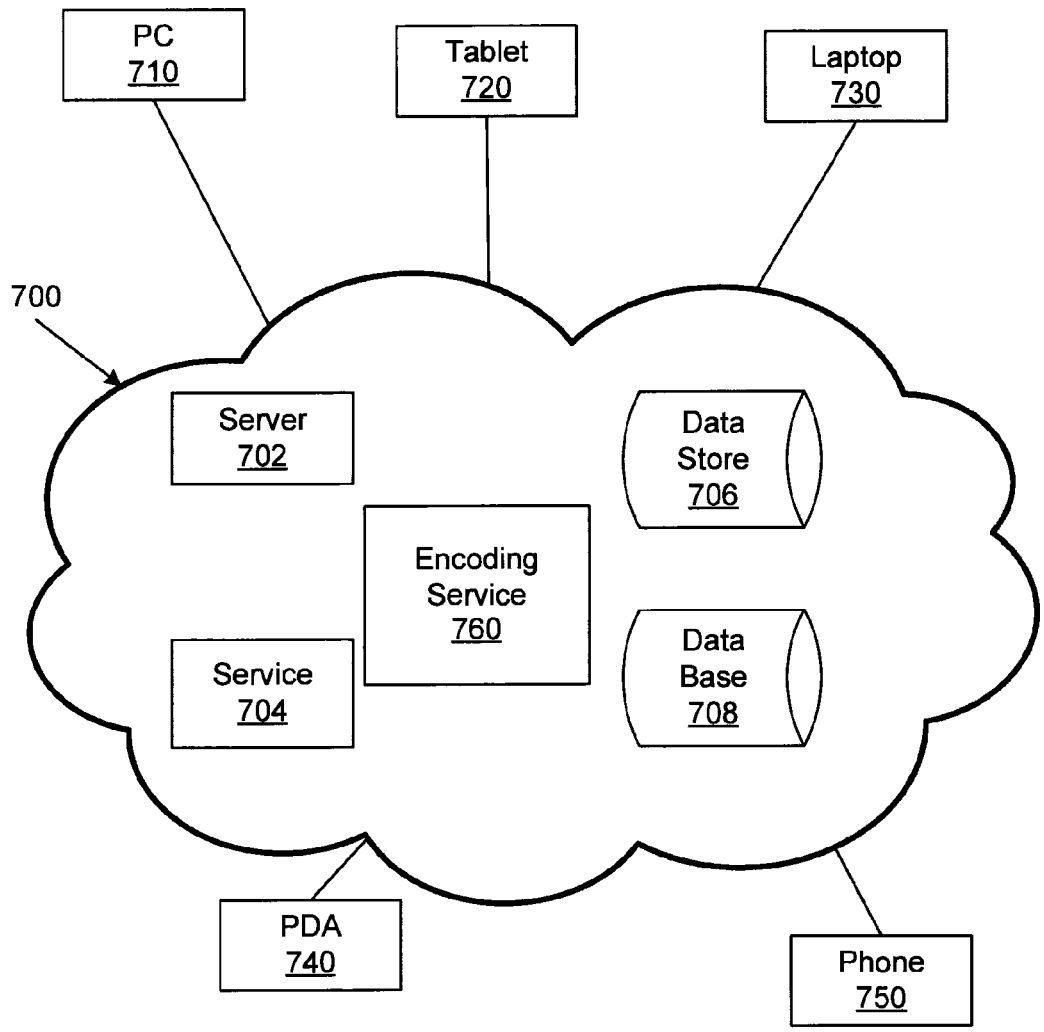
FIG. 7 illustrates an example cloud operating environment.

FIG. 7 illustrates an example cloud operating environment 700. A cloud operating environment 700 supports delivering computing, processing, storage, data management, applications, and other functionality as an abstract service rather than as a standalone product. Services may be provided by virtual servers that may be implemented as one or more processes on one or more computing devices. In some embodiments, processes may migrate between servers without disrupting the cloud service. In the cloud, shared resources (e.g., computing, storage) may be provided to computers including servers, clients, and mobile devices over a network. Different networks (e.g., Ethernet, Wi-Fi, 802.x, cellular) may be used to access cloud services. Users interacting with the cloud may not need to know the particulars (e.g., location, name, server, database) of a device that is actually providing the service (e.g., computing, storage). Users may access cloud services via, for example, a web browser, a thin client, a mobile application, or in other ways.

FIG. 7 illustrates an example encoding service 760 residing in the cloud. The encoding service 760 may rely on a server 702 or service 704 to perform processing and may rely on a data store 706 or database 708 to store data. While a single server 702, a single service 704, a single data store 706, and a single database 708 are illustrated, multiple instances of servers, services, data stores, and databases may reside in the cloud and may, therefore, be used by the encoding service 760.

FIG. 7 illustrates various devices accessing the encoding service 760 in the cloud. The devices include a computer 710, a tablet 720, a laptop computer 730, a personal digital assistant 740, and a mobile device (e.g., cellular phone, satellite phone, wearable computing device) 750. The encoding service 760 may produce a popularity prediction or observation for a game clip. The prediction or observation may be used to control whether the game clip is encoded for adaptive bit rate smooth streaming and stored in a content delivery network.

It is possible that different users at different locations using different devices may access the encoding service 760 through different networks or interfaces. In one example, the encoding service 760 may be accessed by a mobile device 750. In another example, portions of encoding service 760 may reside on a mobile device 750.

Figure 8:
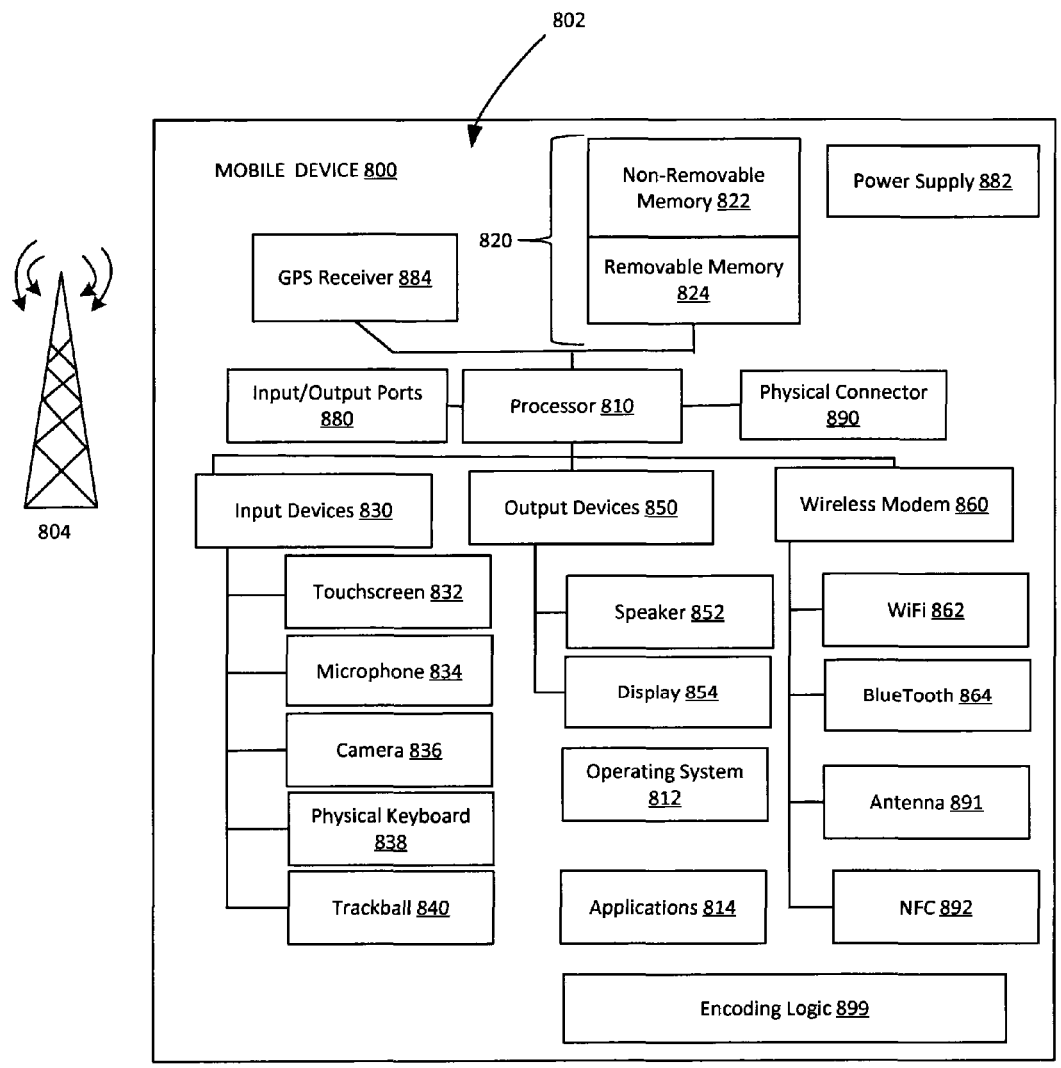
FIG. 8 is a system diagram depicting an exemplary mobile communication device configured to participate in controlling smooth streaming encoding as a function of video game clip popularity predictions.

FIG. 8 is a system diagram depicting an exemplary mobile device 800 that includes a variety of optional hardware and software components, shown generally at 802. Components 802 in the mobile device 800 can communicate with other components, although not all connections are shown for ease of illustration. The mobile device 800 may be a variety of computing devices (e.g., cell phone, smartphone, handheld computer, Personal Digital Assistant (PDA), wearable computing device, etc.) and may allow wireless two-way communications with one or more mobile communications networks 804, such as a cellular or satellite networks.

Mobile device 800 can include a controller or processor 810 (e.g., signal processor, microprocessor, ASIC, or other control and processing logic circuitry) for performing tasks including signal coding, data processing, input/output processing, power control, or other functions. An operating system 812 can control the allocation and usage of the components 802 and support application programs 814. The application programs 814 can include mobile computing applications (e.g., email applications, calendars, contact managers, web browsers, messaging applications), video games, or other computing applications.

Mobile device 800 can include memory 820. Memory 820 can include non-removable memory 822 or removable memory 824. The non-removable memory 822 can include random access memory (RAM), read only memory (ROM), flash memory, a hard disk, or other memory storage technologies. The removable memory 824 can include flash memory or a Subscriber Identity Module (SIM) card, which is well known in GSM communication systems, or other memory storage technologies, such as "smart cards." The memory 820 can be used for storing data or code for running the operating system 812 and the applications 814. Example data can include game clips, web pages, text, images, sound files, video data, or other data sets to be sent to or received from one or more network servers or other devices via one or more wired or wireless networks. The memory 820 can be used to store a subscriber identifier, such as an International Mobile Subscriber Identity (IMSI), and an equipment identifier, such as an International Mobile Equipment Identifier (IMEI). The identifiers can be transmitted to a network server to identify users or equipment.

The mobile device 800 can support one or more input devices 830 including, but not limited to, a touchscreen 832, a microphone 834, a camera 836, a physical keyboard 838, or trackball 840. The mobile device 800 may also support output devices 850 including, but not limited to, a speaker 852 and a display 854. Other possible output devices (not shown) can include piezoelectric or other haptic output devices. Some devices can serve more than one input/output function. For example, touchscreen 832 and display 854 can be combined in a single input/output device. The input devices 830 can include a Natural User Interface (NUI). An NUI is an interface technology that enables a user to interact with a device in a "natural" manner, free from artificial constraints imposed by input devices such as mice, keyboards, remote controls, and others. Examples of NUI methods include those relying on speech recognition, touch and stylus recognition, gesture recognition (both on screen and adjacent to the screen), air gestures, head and eye tracking, voice and speech, vision, touch, gestures, and machine intelligence. Other examples of a NUI include motion gesture detection using accelerometers/gyroscopes, facial recognition, three dimensional (3D) displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 812 or applications 814 can comprise speech-recognition software as part of a voice user interface that allows a user to operate the device 800 via voice commands. Further, the device 800 can include input devices and software that allow for user interaction via a user's spatial gestures, such as detecting and interpreting gestures to provide input to a gaming application.

A wireless modem 860 can be coupled to an antenna 891. In some examples, radio frequency (RF) filters are used and the processor 810 need not select an antenna configuration for a selected frequency band. The wireless modem 860 can support two-way communications between the processor 810 and external devices. The modem 860 is shown generically and can include a cellular modem for communicating with the mobile communication network 804 and/or other radio-based modems (e.g., Bluetooth 864 or Wi-Fi 862). The wireless modem 860 may be configured for communication with one or more cellular networks, such as a Global system for mobile communications (GSM) network for data and voice communications within a single cellular network, between cellular networks, or between the mobile device and a public switched telephone network (PSTN). NFC 892 facilitates having near field communications.

The mobile device 800 may include at least one input/output port 880, a power supply 882, a satellite navigation system receiver 884, such as a Global Positioning System (GPS) receiver, or a physical connector 890, which can be a Universal Serial Bus (USB) port, IEEE 1394 (FireWire) port, RS-232 port, or other port. The illustrated components 802 are not required or all-inclusive, as other components can be deleted or added.

Mobile device 800 may include an encoding logic 899 that is configured to provide a functionality for the mobile device 800. For example, encoding logic 899 may provide a client for interacting with a service (e.g., service 760, FIG. 7). Portions of the example methods described herein may be performed by encoding logic 899. Similarly, encoding logic 899 may implement portions of apparatus described herein. In one embodiment, mobile device 800 may be used to play a video game. A game clip may be generated on mobile device 800 during game play. The encoding logic 899 may predict the popularity of the game clip and participate in deciding whether to encode the game clip for smooth streaming and storage in a content delivery network. In one embodiment, the encoding logic 899 may encode and store the game clip. In another embodiment, the encoding logic 899 may communicate with another device or process (e.g., cloud service 760) to have the game clip encoded and stored.

The following includes definitions of selected terms employed herein. The definitions include various examples or forms of components that fall within the scope of a term and that may be used for implementation. The examples are not intended to be limiting. Both singular and plural forms of terms may be within the definitions.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Data store", as used herein, refers to a physical or logical entity that can store data. A data store may be, for example, a database, a table, a file, a list, a queue, a heap, a memory, a register, and other physical repository. In different examples, a data store may reside in one logical or physical entity or may be distributed between two or more logical or physical entities.

"Logic", as used herein, includes but is not limited to hardware, firmware, software in execution on a machine, or combinations of each to perform a function(s) or an action(s), or to cause a function or action from another logic, method, or system. Logic may include a software controlled microprocessor, a discrete logic (e.g., ASIC), an analog circuit, a digital circuit, a programmed logic device, a memory device containing instructions, and other physical devices. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the Applicant intends to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one of, A, B, and C" is employed herein, (e.g., a data store configured to store one of, A, B, and C) it is intended to convey the set of possibilities A, B, and C, (e.g., the data store may store only A, only B, or only C). It is not intended to require one of A, one of B, and one of C. When the applicants intend to indicate "at least one of A, at least one of B, and at least one of C", then the phrasing "at least one of A, at least one of B, and at least one of C" will be employed.

To the extent that the phrase "one or more of, A, B, and C" is employed herein, (e.g., a data store configured to store one or more of, A, B, and C) it is intended to convey the set of possibilities A, B, C, AB, AC, BC, ABC, AA . . . A, BB . . . B, CC . . . C, AA . . . ABB . . . B, AA . . . ACC . . . C, BB . . . BCC . . . C, or AA . . . ABB . . . BCC . . . C (e.g., the data store may store only A, only B, only C, A&B, A&C, B&C, A&B&C, or other combinations thereof including multiple instances of A, B, or C). It is not intended to require one of A, one of B, and one of C. When the applicants intend to indicate "at least one of A, at least one of B, and at least one of C", then the phrasing "at least one of A, at least one of B, and at least one of C" will be employed.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

What is claimed is:

1. A method performed in a computerized game console operating in an online video game environment, comprising:
   accessing an electronic video recording that was automatically generated by a computerized game console in response to a video game action performed by a user of a video game;
   preparing the electronic video recording for progressive download by another computer;
   computing, in the computerized game console, a first electronic score that represents a predicted popularity of the electronic video recording, where the first electronic score is computed as a function of one or more factors including a first factor associated with the user, a second factor associated with the video game, or a third factor associated with the electronic video recording; and
   upon determining that the first electronic score exceeds a popularity threshold and that a content storage threshold has not been exceeded:
      encoding, in the computerized game console, the electronic video recording into an encoded electronic video recording suitable for smooth streaming via adaptive bit rate streaming, and
      storing the encoded electronic video recording in a content delivery network available to users of the online video game environment, where the content delivery network stores the electronic video recording in encoded form in a distributed cloud environment,
   where the first factor is a number of people who follow the user, a progress level achieved by the user for the video game, a reputation of the user, a number of people the user follows, a percentage of achievements the user has earned in the video game, a percentage of achievements the user has earned in video games related to the video game, a period of time the user has been involved with the online video game environment, a period of time the user has played the video game, a period of time the user has played video games related to the video game, a popularity of another electronic video recording generated in response to an act by the user, a privacy level of the user, a popularity of the user, or a status in the online video game environment of the user,
   where the second factor is a number of users who play the video game, a number of hours the video game has been played, an age of the video game, a popularity of the video game, a current number of electronic video recordings that exist for the video game, a genre of the video game, a number of triggered video capture moments defined for the video game, a data platform event that occurs during the video game, whether the video game was played in single player mode, whether the video game was played in multi-player mode, or an amount of downloadable content available for the video game, and
   where the third factor is a rating of the electronic video recording, a number of times the electronic video recording was rated, a number of times the electronic video recording was viewed, a number of times the electronic video recording was viewed via progressive download, a number of times the electronic video recording was returned in a query, a number of times the electronic video recording was returned in a query and not watched, a content of the electronic video recording, a time at which the electronic video recording was last watched, a number of times the event that triggered automatically generating the electronic video recording has occurred, whether the electronic video recording was generated by the video game, whether the electronic video recording was generated by the user, whether the electronic video recording was generated during single player play, whether the electronic video recording was generated during multi-player play, a number of players involved in a multi-player session when the electronic video recording was generated, a length of the electronic video recording, and a time at which the electronic video generated.

2. The method of claim 1, comprising:
   updating the first factor to produce an updated first factor,
   updating the second factor to produce an updated second factor,
   updating the third factor to produce an updated third factor;
   computing a second electronic score representing an actual popularity of the electronic video recording, where the second electronic score is computed as a function of the updated first factor, the updated second factor, or the updated third factor;
   upon determining that the second electronic score is less than a removal threshold and that the electronic video recording was encoded as an encoded electronic video recording and stored in the content delivery network, removing the encoded electronic video recording from the content delivery network; and
   upon determining that the second electronic score is greater than an encoding threshold and that the electronic video recording was not encoded as an encoded electronic video recording, encoding the electronic video recording as an encoded electronic video recording suitable for smooth streaming via adaptive bit rate streaming and storing the encoded electronic video recording in the content delivery network.

3. The method of claim 2, comprising:
   updating the first factor, the second factor, or the third factor and computing the second electronic score in response to:
   the electronic video recording being viewed a threshold number of times, a time period expiring, an age of the electronic video recording passing an age threshold, the video game having been purchased more than a purchase threshold number of times, the user crossing a popularity threshold, the user crossing a skill threshold, the user crossing a score threshold, or the user crossing an experience threshold.

4. The method of claim 2, comprising updating the function for computing the first electronic score if the second electronic score differs from the first electronic score by more than a difference threshold, where updating the function for computing the first electronic score includes adding a first factor, removing a first factor, changing the relative importance of a first factor, adding a second factor, removing a second factor, changing the relative importance of a second factor, adding a third factor, removing a third factor, or changing the relative importance of a third factor.

5. The method of claim 2, comprising identifying a set of the N most popular encoded electronic video recordings, N being an integer greater than two, identifying a set of users responsible for creation of the set of most popular encoded electronic video recordings, and providing a reward associated with an online video game system to members of the set of users.

6. The method of claim 5, where the reward is additional storage in the online video game environment, recognition in the online video game environment, status in the online video game environment, a unique virtual item for use in the online video game environment, or a download code to access private content in the online video game environment.

7. The method of claim where the function for computing the first electronic score is solely a function of one or more first factors including a friend graph data or is solely a function of one or more second factors.

8. The method of claim 2, where the popularity threshold is an absolute threshold and where all automatically generated electronic video recordings associated with the video game that exceed the popularity threshold are encoded as encoded electronic video recordings suitable for smooth streaming via adaptive bit rate streaming and stored in the content delivery network, or
where the popularity threshold is a relative threshold and where an electronic video recording whose first electronic score is higher than the second electronic score associated with a member of a set of highest rated encoded electronic video recordings will be stored in the set of highest rated encoded electronic video recordings in place of the member of the set of highest rated encoded electronic video recordings.

9. The method of claim 8, where the popularity threshold is computed as a function of the popularity of the video game and where an amount of storage for storing encoded electronic video recordings associated with the video game is determined by the popularity of the video game.

10. The method of claim 1, where the function for computing the first electronic score is customized on a per video game basis.

11. The method of claim 2, comprising:
in response to a viewing of the electronic video recording or the encoded electronic video recording, updating an evidence data store that stores information for understanding correlations between factors used to compute the first electronic score and factors that contribute more than a contribution threshold amount to the second electronic score; and
in response to detecting a correlation change in the evidence data store:
computing the second electronic score, and
updating the function for computing the first electronic score.

12. A non-transitory computer-readable storage medium storing computer-executable instructions that when executed by a computer control the computer to perform a method, the method comprising:
accessing an electronic video recording that was automatically generated by a computerized game console operating in an online video game environment in response to a video game action performed by a user of a video game in an online video game environment;
preparing the electronic video recording for progressive download;
computing a first electronic score that represents a predicted popularity of the electronic video recording, where the first electronic score is computed as a function of a first factor associated with the user, a second factor associated with the video game, or a third factor associated with the electronic video recording; and upon determining that the first electronic score exceeds a popularity threshold and that a content storage threshold has not been exceeded:
encoding the electronic video recording into an encoded electronic video recording suitable for smooth streaming via adaptive bit rate streaming, and
storing the encoded electronic video recording in a content delivery network available to users of the online video game environment, where the content delivery network stores the electronic video recording in encoded form in a distributed cloud environment,
where the first factor is a number of people who follow the user, a progress level achieved by the user for the video game, a reputation of the user, a number of people the user follows, a percentage of achievements the user has earned in the video game, a percentage of achievements the user has earned in video games related to the video game, a period of time the user has been involved with the online video game environment, a period of time the user has played the video game, a period of time the user has played video games related to the video game, a popularity of another electronic video recording generated in response to an act by the user, a privacy level of the user, a popularity of the user, or a status in the online video game environment of the user,
where the second factor is a number of users who play the video game, a number of hours the video game has been played, an age of the video game, a popularity of the video game, a current number of electronic video recordings that exist for the video game, a genre of the video game, a number of triggered video capture moments defined for the video game, a data platform event that occurs during the video game, whether the video game was played in single player mode, whether the video game was played in multi-player mode, or an amount of down loadable content available for the video game, and
where the third factor is a rating of the electronic video recording, a number of times the electronic video recording was rated, a number of times the electronic video recording was viewed, a number of times the electronic video recording was viewed via progressive download, a number of times the electronic video recording was returned in a query, a number of times the electronic video recording was returned in a query and not watched, a content of the electronic video recording, a time at which the electronic video recording was last watched, a number of times the event that triggered automatically generating the electronic video recording has occurred, whether the electronic video recording was generated by the video game, whether the electronic video recording was generated by the user, whether the electronic video recording was generated during single player play, whether the electronic video recording was generated during multi-player play, a number of players involved in a multi-player session when the electronic video recording was generated, a length of the electronic video recording, and a time at which the electronic video recording was generated,
in response to the electronic video recording being viewed a threshold number of times, a time period expiring, an age of the electronic video recording passing an age threshold, the video game having been purchased more than a purchase threshold number of times, the user crossing a popularity threshold, the user crossing a skill threshold, the user crossing a score threshold, or the user crossing an experience threshold:

updating the first factor to produce an updated first factor;
updating the second factor to produce an updated second factor;
updating the third factor to produce an updated third factor;
computing a second electronic score representing an actual popularity of the electronic video recording, where the second electronic score is computed as a function of the updated first factor, the updated second factor, or the updated third factor;
upon determining that the second electronic score is less than a removal threshold and that the electronic video recording was encoded as an encoded electronic video recording and stored in the content delivery network, removing the encoded electronic video recording from the content delivery network; and
upon determining that the second electronic score is greater than an encoding threshold and that the electronic video recording was not encoded as an encoded electronic video recording, encoding the electronic video recording as an encoded electronic video recording suitable for smooth streaming via adaptive bit rate streaming and storing the encoded electronic video recording in the content delivery network;
selectively updating the function for computing the first electronic score if the second electronic score differs from the first electronic score by more than a difference threshold, where updating the function for computing the first electronic score includes adding a first factor, removing a first factor, changing the relative importance of a first factor, adding a second factor, removing a second factor, changing the relative importance of a second factor, adding a third factor, removing a third factor, or changing the relative importance of a third factor; and
identifying a set of the N most popular encoded electronic video recordings, N being an integer greater than two, identifying a set of users responsible for creation of the set of most popular encoded electronic video recordings, and providing a reward associated with the online video game system to members of the set of users.

13. A method performed in a computerized game console operating in an online video game environment, comprising:
accessing an electronic video recording that was automatically generated by the computerized game console in response to a video game action performed by a user of a video game played on the computerized game console;
computing, in the computerized game console, a first electronic score that represents a predicted popularity of the electronic video recording, where the first electronic score is computed as a function of one or more factors including a first factor associated with the user, a second factor associated with the video game, or a third factor associated with the electronic video recording;
upon determining that the first electronic score does not exceed a popularity threshold:
preparing the electronic video recording for progressive download by another computer, and
storing the prepared electronic video recording in a content delivery network available to users of the online video game environment; and
upon determining that the first electronic score exceeds a popularity threshold and that a content storage threshold has not been exceeded:
encoding, in the computerized game console, the electronic video recording into an encoded electronic video recording suitable for smooth streaming via adaptive bit rate streaming, and
storing the encoded electronic video recording in a content delivery network available to users of the online video game environment, where the content delivery network stores the electronic video recording in encoded form in a distributed cloud environment,
where the first factor is a number of people who follow the user, a progress level achieved by the user for the video game, a reputation of the user, a number of people the user follows, a percentage of achievements the user has earned in the video game, a percentage of achievements the user has earned in video games related to the video game, a period of time the user has been involved with the online video game environment, a period of time the user has played the video game, a period of time the user has played video games related to the video game, a popularity of another electronic video recording generated in response to an act by the user, a privacy level of the user, a popularity of the user, or a status in the online video game environment of the user,
where the second factor is a number of users who play the video game, a number of hours the video game has been played, an age of the video game, a popularity of the video game, a current number of electronic video recordings that exist for the video game, a genre of the video game, a number of triggered video capture moments defined for the video game, a data platform event that occurs during the video game, whether the video game was played in single player mode, whether the video game was played in multi-player mode, or an amount of down-loadable content available for the video game, and
where the third factor is a rating of the electronic video recording, a number of times the electronic video recording was rated, a number of times the electronic video recording was viewed, a number of times the electronic video recording was viewed via progressive download, a number of times the electronic video recording was returned in a query, a number of times the electronic video recording was returned in a query and not watched, a content of the electronic video recording, a time at which the electronic video recording was last watched, a number of times the event that triggered automatically generating the electronic video recording has occurred, whether the electronic video recording was generated by the video game, whether the electronic video recording was generated by the user, whether the electronic video recording was generated during single player play, whether the electronic video recording was generated during multi-player play, a number of players involved in a multi-player session when the electronic video recording was generated, a length of the electronic video recording, and a time at which the electronic video recording was generated.

* * * * *